United States Patent [19]

Harris et al.

[11] 4,092,293
[45] May 30, 1978

[54] POLYMERCAPTANS FOR CURING EPOXY RESINS AND METHOD OF PREPARATION THEREOF

[75] Inventors: Richard L. Harris; Paul H. Goble, both of Painesville, Ohio

[73] Assignee: Diamond Shamrock Corporation, Cleveland, Ohio

[21] Appl. No.: 699,335

[22] Filed: Jun. 24, 1976

[51] Int. Cl.² ............................................. C08G 59/50
[52] U.S. Cl. ................................ 260/47 EC; 260/48; 260/79; 260/609 R; 260/609 B; 260/830 S
[58] Field of Search ................. 260/79, 609 B, 609 R, 260/47 EC, 48, 830 S

[56] References Cited

U.S. PATENT DOCUMENTS

| | | | |
|---|---|---|---|
| 3,258,495 | 6/1966 | Le Fave et al. | 260/47 EC |
| 3,472,913 | 10/1969 | Ephriam | 260/830 S |

*Primary Examiner*—Melvyn I. Marquis
*Attorney, Agent, or Firm*—Bruce M. Winchell

[57] ABSTRACT

Disclosed is a polymercaptan material and method for preparation thereof useful in the curing of epoxy resins to impart a more hydrophobic characteristic to the resultant thermoset polymers for use in applications where there is frequent contact with water. The compound described and prepared is a propoxylated ether polythiol of the structure:

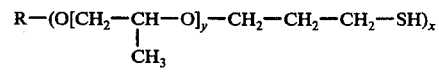

wherein $y$ is an integer of at least 1, $x$ is an integer of at least 2, R is a polyol consisting of atoms of carbon, hydrogen and oxygen and free of reactive functional groups and the total number carbon atoms in R and

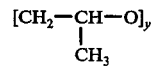

is greater than 15.

10 Claims, No Drawings

POLYMERCAPTANS FOR CURING EPOXY RESINS AND METHOD OF PREPARATION THEREOF

BACKGROUND OF THE INVENTION

The present invention relates generally to a polymercaptan material and the preparation thereof which is useful in the curing process of epoxy resin materials for use in applications where there is frequent contact with water. More particularly, the present disclosure relates to a propoxylated ether polythiol of the structure:

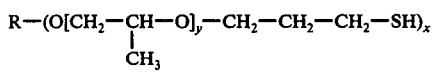

wherein $y$ is an integer of at least 1, $x$ is an integer of at least 2 and R is a polyol consisting of atoms of carbon, hydrogen and oxygen and free of reactive functional groups and the total number of carbon atoms in R and

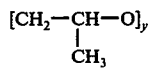

is greater than 15.

The term epoxy resins is a trivial name given to a class of polymers prepared by a step-growth polymerization of a bifunctional alkylene epoxide with a bifunctional or polyfunctional nucleophile. The polymers prepared are essentially linear, low molecular weight fusible prepolymer polyethers with reactive epoxide end groups commonly referred to as epoxy resins. These resins, when combined with the proper curing agents such as polymercaptans, provide thermoset polymers exhibiting a high degree of chemical resistance, outstanding adhesion to most substrates, low shrinkage, and good impact strength and flexibility. The principal applications for the thermoset polymers are binders for industrial baking finishes, high performance maintenance and marine coatings, adhesives, reinforced plastics, electrical potting and encapsulation and matrices for industrial flooring and wall panels utilized in building construction. Many of these applications involve contact with water and climatic elements. Therefore it is a matter of concern when these thermoset polymers absorb water to the extent that the adhesive bonds break or the corrosion resistance of the material is impaired as to cause failure or other undesirable defects within the material. Although maximizing the properties of the resultant thermoset polymers both chemically and physically is a desirable aim, consideration must be given to the cure rate and cure properties of a given material along with undesirable characteristics of the components to make these thermoset polymers such as the distinctly undesirable olfactory characteristics of polymercaptans as well as the expense involved in use of such polymercaptans in these thermoset polymers.

It would therefore be highly desirable to be able to produce a thermoset polymer derived from epoxy resins that would meet many of the above-described criteria utilizing a polymercaptan for curing the epoxy resin to obtain materials for uses especially subject to the climatic elements such as water.

SUMMARY OF THE INVENTION

It is therefore an object of the present invention to provide a polymercaptan for the curing of epoxy resins to yield thermoset polymers having particularly good resistance to the absorption of water and thereby improving the adhesion bond strength of the thermoset polymers while having a fast curing characteristic within the range of commercial feasibility for production.

These and other objects of the present invention together with the advantages thereof over existing prior art forms which will become apparent to those skilled in the art from detailed disclosure of the present invention as set forth hereinbelow, are accomplished by the improvements herein described and claimed.

It has been found that the polymercaptan particularly useful for curing epoxy resins to impart particular resistance to the absorption of water by the resultant thermoset polymers can comprise: a propoxylated ether polythiol of the structure

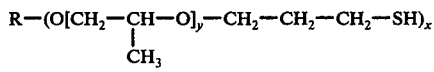

wherein $y$ is an integer of at least 1, $x$ is an integer of at least 2 and R is a polyol consisting of atoms of carbon, hydrogen and oxygen and free of reactive functional groups and the total number of carbon atoms in R and

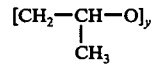

is greater than 15.

DESCRIPTION OF THE PREFERRED EMBODIMENT

It is believed that the more hydroxyl groups alpha to the thiol group that there are in the polymercaptan, the more sensitive the resultant thermoset polymers will be to water absorption and therefore bond weakening and/or climatic conditions. It has also been found to be desirable to have as many SH groups, commonly referred to as thiol groups, on the end of the carbon chain as possible in order to result in the good properties of a thermoset polymer. Further, it is desirable that the polymercaptan be free of any other reactive functional groups. Polymercaptans discussed hereinbelow consist essentially to entirely of carbon, hydrogen and oxygen atoms with any additional atoms being typically sulfur. These polymercaptans will have number average molecular weights generally in the range of 300 to 5,000 and an SH or thiol equivalency generally in the range of .4 to 10 milliequivalents of mercaptan per gram of polymer. Since the polymercaptan is a weak link in the thermoset polymer and the thiol equivalency is a function of the amount of polymercaptan necessary to cure the epoxy resins, the higher the thiol equivalency is expressed in terms of milliequivalents of SH functionality per gram of resin as generally measured by iodometric titration, the better.

It has been found that a propoxylated ehter polythiol of the structure:

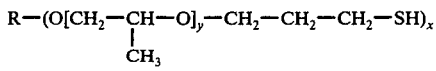

wherein y is an integer of at least 1, x is an integer of at least 2 and R is a polyol consisting of atoms of carbon, hydrogen and oxygen having from 2 to 6 hydroxyl groups and free of reactive functional groups, and the total number of carbon atoms in R and

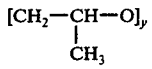

is greater than 15, will produce a polymercaptan capable of significantly increasing water absorption resistance of thermoset polymers resulting from epoxy resins cured with these polymercaptans. A typical polymercaptan suitable for curing an epoxy resin to result in thermoset polymer can be prepared by mixing in a pressure reactor fitted with a stirrer, a thermowell, cooling coil with automatic temperature control and a charge port; an allyl ether of a polyoxypropylated pentaerythritol, a solvent such as a benzene or perhaps other aliphatics, and an azo catalyst with a low decomposition temperature such as 2,2'-azobis-(2,4-dimethyl valeronitrile). Allyl ethers of this type may be produced by a Williamson synthesis in a manner described in U.S. Pat. Nos. 3,431,308 and 3,883,598 which are hereby incorporated by reference. Hydrogen sulfice can be added to obtain a substantial excess over the stoichiometric amount so that mixture is saturated at approximately 150 pounds per square inch (10.55 kilograms per square centimeter). After saturation the hydrogen sulfide supply is stopped and the reaction mixture gradually raised in temperature to promote the reaction. After a sufficient reaction time the excess hydrogen sulfide is vented and the reaction mixture is cooled to room temperature before transferring to a rotary evaporator for stripping of the solvent. After purification by stripping the solvent and filtering through diatomaceous earth, a pure sparkling resin product is obtained.

It has been found that a broad range of reaction conditions can be used in the preparation of the polymercaptans, including Benzene/Allyl ether Ratio = 10/1 to no benzene
$H_2S$ pressure = 80 to 388 psi (5.6 to 27.3 kg. per sq. cm.)
Temperature = 20 to 90° C.
Reaction Time = 0 to 15 hours The lower molecular weight starting materials result in polymercaptans very offensive to the olfactory senses in addition to being very expensive and hence seem unsuitable at the present time for commercial use.

The resultant polymercaptans are described above can be blended with epoxy resins in the presence of an amine catalyst to produce a thermoset polymer having good hardness and excellent water absorption resistivities compared to compounds of prior practice. Epoxy compounds such as a liquid resin consisting essentially of the diglycidyl ether of Bisphenol A commercially available from a number of manufactures such as the one sold by Ciba Products Company under the trademark ARALDITE 6010, can be mixed in various proportions with the polymercaptan produced according to the above-described method using amine curing agent available commercially from the Diamond Shamrock Corporation sold under the trademark EH-30, to produce a thermoset polymer. The preferred amines are the tertiary amines.

The gel times and hardness values according to the Shore hardness test are within the range of commercially available compounds. The shelf life of these materials is generally in excess of six months, which is within commercial standards presently. In addition the thermoset polymers made with the polymercaptans of the present invention show significant increase in the resistance to water absorption for a given hardness. These polymers would be particularly suitable where exposure to the climatic elements including water is a particular problem at present with commercially available compounds. One example of such a use would be in adhesives for adhering such articles as a road-marker to the road surface of a highway in an area subject to extreme weather conditions in addition to the shearing forces of snowplows going over top of the road-markers which are adhered to the surface.

In order that those skilled in the art may more readily understand the present invention and certain preferred aspects by which it may be practiced, the following specific examples are afforded to show the method of preparation of the polymercaptans and their effectiveness for curing epoxy resins to yield thermoset polymers with significantly increased resistance to water absorption.

EXAMPLE 1

An initial charge of 1200 g. of allyl ether of polyoxypropylated pentaerythritol (7.84 equivalents), 1200 g. of benzene and 24 g. of 2,2'-azobis-(2,4-dimethyl valeronitrile) available commercially from National Polychemicals, Inc. under the trademark POLY-ZOLE ADV, was placed into a 1-gallon, stainless steel pressure reactor fitted with a stirrer, thermowell, cooling coil with automatic temperature control, charge port, $H_2S$ and $N_2$ inlets, pressure gauge, 300 psi (21.08 kg. per. sq. cm.) rupture disk, gas vent line, liquid sampling line, dump valve, and an external heater. The reactor was sealed, the stirrer started, and the thermoregulator set for maximum cooling. At this point the temperature was about 23° C. Hydrogen sulfide was then added until the mixture was saturated at 150 psi (10.55 kg. per sq. cm.) at 25° C. This requires about 750 g. of hydrogen sulfide (22 moles). The hydrogen sulfide supply was then stopped and the thermoregulator set for 50° C. The operating temperature and the maximum operating pressure of 252 psi (17.72 kg. per sq. cm.) were reached in 37 minutes. After four hours the pressure was 238 psi (16.73 kg. per sq. cm.) and the excess hydrogen sulfide was vented to a scrubber containing 22 percent sodium hydroxide solution. The reactor was cooled to 25° C. and the product was transferred to a rotary evaporator operated at a temperature of 50° C. and a pressure of 0.2 mm. of mercury. Once all of the solvent was removed, a slightly hazy polymercaptan product, weighing 1365 g. is obtained, which may be filtered through diatomaceous earth to produce a sparkling clear resin. The thiol equivalent as determined by iodometric titration equalled 3.83 meg/g. and the sulfur content was 13%.

EXAMPLE 2

The method described in Example 1 was used to prepare a polymercaptan resin from the allyl ether of polyoxypropylated sorbitol. A 1-liter reactor was used.
Charged to reactor were:

50 g. allyl ether of polyoxypropylated sorbitol (0.20 equivalent)
500 g. benzene
2 g. catalyst
Reaction conditions included:
H₂S Saturation pressure = 60 psi (4.2 kg. per sq. cm.) at 30° C.
Maximum pressure = 83 psi (5.8 kg. per sq. cm.)
Reaction time = 6 hours
Reaction temperature = 50° C.
The thiol equivalent = 3.23 meq/g.
Sulfur content = 11.9 percent

EXAMPLE 3

To evaluate the resulting thermoset polymers, polymercaptans were prepared from the allyl ethers of polyoxyproplated pentaerythritol and polyoxypropylated sorbitol, identified hereinafter by the designations P Resin and S Resin, respectively, and blended with epoxy resin and an amine catalyst. The resulting thermoset polymers were tested for gel time, hardness and water absorption, and compared with blends made from a standard resin produced according to Example 1 of U.S. Pat. No. 3,764,578. In making the blends, 100 parts of a liquid epoxy resin available commercially form Ciba Products Company under the trademark ARALDITE 6010, 60 parts of the polymercaptan to be tested, and 6 parts of a tertiary amine curing agent available commercially from Diamond Shamrock under the trademark EH-30, were mixed well and used for the described tests.

Gel time was determined by measuring the time required to obtain the point when the well-mixed formulation, spread on a 6 inch × 6 inch (152.4 × 152.4 mm) aluminum block to a thickness of about 0.1 inch (2.54 mm), no longer adhered to a wooden stick when it was pulled in a direction perpendicular to the sample surface.

Hardness values were determined with a Shore Durometer (Type D) on the test specimens, 2 inch (50.8 mm) diameter by about ⅛ inch (3.175 mm) thick, cast in TEFLON cavity molds. The specimens were cured seven days at 24° C. before performing the tests for hardness and water absorption.

Water absorption is expressed in terms of the number of grams of weight gain per square inch of surface of the test specimen after immersion in distilled water at room temperature for eight weeks.

TABLE I

| Type of Mercaptan in Blend | Gel Time (min.) | Shore "D" Hardness Initial | 8 weeks | Weight gain (g/in.²) | Weight gain (g/cm.²) |
|---|---|---|---|---|---|
| Standard Resin | 5.5 | 81 | 76 | .069 | .011 |
| P Resin | 37 | 81 | 79 | .036 | .006 |
| S Resin | 40 | 80 | 79 | .041 | .006 |

It can be easily observed that the polymercaptans of the present invention can be used to cure epoxy resins to result in thermoset polymers exhibiting longer gel time, lower weight gains and greater Shore "D" hardnesses after eight weeks immersion than the standard resin.

Thus, it should be apparent from the foregoing description of the preferred embodiment of the method and substances herein described, accomplish the objects of the invention and solve the problems attendant to the use of polymercaptans in the curing of epoxy resins to form thermoset polymers for use under extreme climatic conditions.

What is claimed is:

1. A polymercaptan particularly useful for curing epoxy resins to impart particular resistance to the absorption of water by the resultant thermoset polymers comprising: a propoxylated ether polythiol of the structure

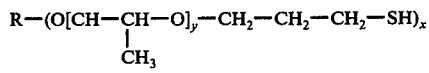

wherein $y$ is an integer of at least 1, $x$ is an integer of at least 2, and R is a polyol consisting of atoms of carbon, hydrogen, and oxygen having from 2 to 6 hydroxyl groups and free of reactive functional groups and the total number of carbon atoms in R and

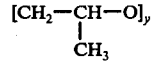

is greater than 15.

2. A polymercaptan according to claim 1 wherein R equals pentaerythritol.
3. A polymercaptan according to claim 1 wherein R equals dipentaerythritol.
4. A polymercaptan according to claim 1 wherein R equals glycerin.
5. A polymercaptan according to claim 1 wherein R equals propylene glycol.
6. A polymercaptan according to claim 1 wherein R equals trimethylolpropane.
7. A polymercaptan according to claim 1 wherein R equals sorbitol.
8. A thermoset polymer resulting from the reaction of a propoxylated ether polythiol and an epoxy resin in the presence of an amine catalyst comprising: a propoxylated ether polythiol of the structure

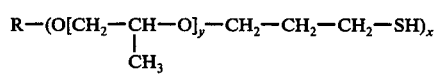

wherein $y$ is an integer of at least 1, $x$ is an integer of at least 2 and R is polyol consisting of atoms of carbon, hydrogen and oxygen having from 2 to 6 hydroxyl groups and free of reactive functional groups, and the total number of carbon atoms in R and

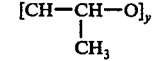

is greater than 15; and an epoxy resin wherein the resultant thermoset polymer exhibits a water absorption rate over a period of not less than six weeks of less than 0.050 grams per square inch (0.00775 grams per square centimeter) when reacted in the presence of an amine catalyst.

9. A thermoset polymer according to claim 8 having a Shore D hardness of greater than 50.
10. A process for the manufacture of polymercaptans useful in curing epoxy resins to produce thermoset polymers which exhibit particular resistance the absorption of water comprising the steps of: introducing into a reactor an allyl ether, sufficient benzene to produce a benzene to allyl ether ratio in the range of 10/1 to .001/1, and an azo catalyst having a low decomposition temperature; introducing hydrogen sulfide to obtain a substantial excess over the stoichiometric amount so that the reactants are saturated under a pressure in the range of 80 to 388 psi (5.6 to 27.3 kg. per sq. cm.) and at a temperature in the range of 20° to 90° C; gradually raising the temperature within the range of 20° to 90° C to promote the reaction; after a period of time in the range of 0 to 15 hours, venting the excess hydrogen sulfide; cooling the reaction mixture to nearly room temperature; and stripping the solvent from the reaction mixture to obtain the polymercaptan product.

* * * * *